US005393936A

United States Patent [19]
Tyhy et al.

[11] Patent Number: 5,393,936
[45] Date of Patent: Feb. 28, 1995

[54] ON BOARD WEIGHING SYSTEM FOR A VEHICLE

[75] Inventors: Gary Tyhy; Gordon Pizey; Jean-Paul Simbandumwe, all of Winnipeg, Canada

[73] Assignee: Rancan Fertilizer Systems, Inc., Winnipeg, Canada

[21] Appl. No.: 946,918

[22] Filed: Sep. 18, 1992

[30] Foreign Application Priority Data

Feb. 12, 1992 [CA] Canada ................ 2061071

[51] Int. Cl.$^6$ .................. G01G 19/12; G01G 19/00
[52] U.S. Cl. ..................... 177/138; 177/145; 177/199
[58] Field of Search ............. 177/136–141, 177/145, 154–159, 199

[56] References Cited

U.S. PATENT DOCUMENTS

| | | | |
|---|---|---|---|
| 3,146,839 | 9/1964 | Carlson | 177/136 |
| 3,279,550 | 10/1966 | Kersten | 177/136 |
| 3,773,123 | 11/1973 | Martinez de Castro Lopez | 177/136 |
| 4,095,659 | 6/1978 | Blench et al. | 177/136 |
| 4,393,951 | 7/1983 | Horst-Rudolf | 177/136 |
| 4,456,084 | 6/1984 | Miller | 177/141 |
| 4,589,507 | 5/1986 | Curran | 177/138 |
| 4,623,029 | 11/1986 | Bambaur et al. | 177/137 |
| 4,666,003 | 5/1987 | Reichow | 177/136 |
| 4,905,780 | 3/1990 | Goff, III | 177/136 |

FOREIGN PATENT DOCUMENTS

| | | |
|---|---|---|
| 976992 | 10/1975 | Canada . |
| 1048558 | 2/1979 | Canada . |
| 1060484 | 8/1979 | Canada . |
| 1150977 | 8/1983 | Canada . |

*Primary Examiner*—George H. Miller, Jr.
*Attorney, Agent, or Firm*—Brumbaugh, Graves, Donohue & Raymond

[57] ABSTRACT

An on-board weigh scale for a vehicle is disclosed. The weigh scale has a transport configuration wherein the weigh scale is substantially protected from damage during transport, and a weighing configuration wherein the weigh scale is in an operative condition for measuring the weight of a material. The weigh scale includes a support-frame capable of being mounted on a frame of a vehicle; a weight-frame mounted above the support-frame, and capable of supporting a quantity of a material. Structural supports are mounted on the support-frame for securely supporting the weigh-frame in the transport configuration. Hydraulic jacks are used to lift the weigh-frame off of the structural supports when said weigh scale is in transition between the transport and the weighing configurations. The weight of material is detected by load cells, via load transfer elements which are installed when the weigh scale is in the weighing configuration. The load transfer elements are removed in the transport configuration, in which condition, the load cells are not subject to any of the weight of the material. Finally angle sensors are used to detecting the angle of orientation of weigh scale with respect to vertical. The detected angle is used to determine a calibration signal, thus allowing for compensation of an error in the weight detected by the load cells resulting from an out-of level condition of the weigh scale, thereby facilitating accurate weight measurements.

27 Claims, 6 Drawing Sheets

SECTION A-A

ON BOARD WEIGHING SYSTEM FOR A VEHICLE

FIELD OF THE INVENTION

The present invention relates to an apparatus for measuring the weight of a product stored on a vehicle. More particularly, the present invention relates to an improved on-board weighing system for a truck.

BACKGROUND TO THE INVENTION

On-board weighing systems are known in the art. Typically, load cells, or similar load-sensing means are mounted between the truck frame and a container in which a product is placed for transport. By this means, the weight of product in the container can be determined.

This elementary weighing system suffers from a variety of deficiencies. For example the load cells are preferably sized to provide a reasonably accurate measure of the weight of material in the container, while the truck is stationary (i.e. during loading of the truck). However, during transport, the load cells can be expected to be subjected to (at least transient) loads far in excess of the "static" weight of the product in the container. Furthermore, during transport, the container will also be subjected to substantial lateral (side-to-side), and longitudinal (front to back) forces, all of which must be resisted by the load cells. These transient loads can easily result in damage to the load cell, thus degrading the accuracy of weight measurements taken using the cell.

A variety of solutions have been proposed for protecting the load cells during transport. For example, U.S. Pat. No. 3,146,839 (Carlson) discloses a weight measuring system in which load cells are positioned between the truck frame and a portion of the body so that the weight of material stored in the truck body can be measured. Additionally, a restraining system is connected between the body and frame of the truck in order to prevent excessive lateral forces being applied to the load cells. However, this restraining system does not prevent large transient vertical loads being applied to the load cells, and thus the cells must be fabricated large enough to withstand these large vertical loads.

However, fabricating the load cells sufficiently strong enough to withstand these loads reduces the sensitivity of the load cells to such an extent that the weight of a product cannot reliably be measured with a high degree of accuracy. For this reason, a weight scale based on the disclosure of U.S. Pat. No. 3,146,839 cannot be made sufficiently precise to meet the criteria of regulatory agencies for use in trade.

In an alternative system, U.S. Pat. No. 4,905,780 describes a mobile livestock weigh scale in which the weighing cage is lifted off the load cells and supported on spacer elements or blocks during transport. The frame of the weigh scale includes extendable legs which facilitate levelling of the scale. By this means, the load cells can be precise enough to be used in trade, and precise levelling of the frame prior to use ensures that the weights measured will be accurate. However, under normal conditions, proper levelling of the scale can be very difficult, and ultimately relies on the skill of the operator and the unevenness of the terrain. Thus achieving consistently accurate weight measurements from location to location is extremely difficult.

As a result of the above-described difficulties associated with measuring weight to a sufficiently high degree of accuracy for use in trade, many products, although quoted and sold by weight, are in fact measured by volume.

For example, Anhydrous Ammonia ($NH_3$) is a liquified gas commonly used as a fertilizer. The $NH_3$ is typically delivered to a farm in a large "nurse" truck which has one or two large pressurised tanks for storing the product. A quantity of the anhydrous ammonia is then dispensed into storage tanks from the nurse truck, for later use by the farmer. Typically, the quantity of $NH_3$ stored on the nurse truck is substantially more than the quantity to be delivered, and thus it is necessary to accurately measure the quantity of $NH_3$ dispensed.

While Anhydrous ammonia is typically sold by weight, the quantity of $NH_3$ dispensed from the nurse truck is usually measured by volume, because of the aforementioned difficulties associated with obtaining a sufficiently accurate weight measurement. However, $NH_3$ is highly corrosive, thus leading to rapid deterioration of the volumetric meters, and resultant errors on the volume measurement. For this reason, volumetric meters must be regularly serviced and recalibrated, thus leading to increased costs.

SUMMARY OF THE INVENTION

It is an object of the present invention to provide a nurse truck capable of dispensing an accurately weight-measured quantity of a product.

It is another object of the present invention to provide an improved on-board weigh scale of sufficient precision and sensitivity to be used for trade.

It is a further object of the present invention to provide an improved on-board weight measuring system capable of automatically compensating for an out-of-level orientation of a weigh scale.

According to an aspect of the present invention there is provided a nurse truck for transporting and dispensing a quantity of a material, said nurse truck comprising storage means capable of containing therein a quantity of a material; dispensing means capable of controllably dispensing the material from said storage means; weight measuring means adapted to measure the weight of the material in said storage means, said weight measuring means having a transport configuration wherein the weight measuring means is substantially protected from damage during transport, and a weighing configuration wherein the weight measuring means is in an operative condition for measuring the weight of the material; and angle compensating means for detecting an angle of said weight measuring means with respect to vertical, and adjusting a calibration of said weight measuring means on the basis of said detected angle.

According to another aspect of the present invention there is provided an on-board weigh scale for a vehicle, said weigh scale having a transport configuration wherein the weigh scale is substantially protected from damage during transport, and a weighing configuration wherein the weigh scale is in an operative condition for measuring the weight of a material, said weigh scale comprising a support-frame capable of being mounted on a frame of a vehicle; a weigh-frame operatively disposed above said support-frame, and capable of supporting a quantity of a material; support means disposed on said support-frame and capable of securely supporting said weigh-frame in the transport configuration; lifting means capable of lifting said weigh-frame off of said support means when said weigh scale is in transition between the transport and the weighing configurations; a plurality load cells, each load cell being capable of supporting a load and generating a signal proportional to the magnitude of said load; respective load transfer means for transferring a portion of the weight of said weigh-frame onto each said load cell when said weigh scale is in the weighing configuration, said load transfer means being removable in the transport configuration; angle sensing means capable of detecting an angle of orientation of said weigh scale, and generating a signal proportional to the detected angle; and processing means capable of determining the weight of a material on said weigh-frame on the basis of signals received from each said load cell, and said angle sensing means.

According to a further aspect of the present invention, there is provided a weight measuring system for determining a weight of a material stored on an onboard weigh scale having weight detecting means, said weight measuring system comprising signal receiving and conditioning means for receiving a signal indicative of a weight detected by said weight detecting means, and generating a weight signal indicative of the weight of the material; first processing means for determining a weight of the material on the basis of the signal generated by said signal receiving and conditioning means; angle compensating means for detecting an angular orientation of said weigh scale with respect to vertical, and for adjusting a calibration of said first processing means in response thereto.

In a preferred embodiment of the invention, a nurse truck may comprise one or two tanks mounted on a weigh-frame. In addition, a product dispensing pump and hose system is also installed on the weigh-frame. Thus the weight of all of the product storage and dispensing equipment is supported on the weigh-frame. By this means, the weight of product on the nurse truck, either in the tanks and/or in the associated dispensing equipment can be known simply from the difference between the empty and full (or partially filled) weights of the weigh-frame.

The weigh-frame is disposed above a support-frame, which is preferably mounted on the chassis of the nurse truck. The weigh-frame can be supported on interface beams mounted between the support-frame and weigh-frames, when the system is in a "transport" mode, and thus in a condition for transport. When the system is in a "weighing" configuration, the weigh-frame is supported by a set of load cells mounted between the support-frame and the weigh-frame.

The signals generated by the load cells are added together, and supplied to a multi-channel digital weight indicator, which calculates and displays the weight of the product. The multi-channel digital weight indicator also includes a number (for example 3) of calibration input ports, by which the digital weight indicator can be adjusted (or calibrated) to provide an accurate indication of the weight.

As is well known in the art, conventional load cells are designed to accurately measure loads in only one direction. For the purposes of measuring a weight, this "loading axis" is preferably vertical. If the loading axis of the load cell is oriented at an angle to vertical (as might be expected, for example, when the nurse truck is situated on uneven ground) then the load sensed by the load cell will be a fraction of the actual weight. This fraction is definable in terms of the angle between the load axis and vertical.

In order to determine the angular orientation of the load cells, a dual axis clinometer (or alternatively two single axis clinometers mounted orthogonal to each other) is mounted on the support-frame so as to measure the angular orientation of the support-frame in both the longitudinal (front-to back) and lateral (side-to-side) directions. The signals generated by the clinometer is used to determine any deviation of the support-frame from horizontal and consequently, an adjustment signal is generated and supplied to the multi-channel digital weight indicator, thereby ensuring that an accurate indication of weight is provided, in spite of the fact that the load cells may not be perfectly aligned with vertical.

In a preferred embodiment of the invention, in order to facilitate conversion of the nurse truck from a "transport" configuration to a "weighing" configuration, hydraulic jacks are installed between the support-frame and the weight-frame. Thus the nurse truck can be converted from a "transport" configuration to a "weighing" configuration by extending the hydraulic jacks so as to lift the weigh-frame off of the interface beams; link elements are placed between the weigh-frame and the load cells; and the hydraulic jacks released to lower the weigh-frame until it is fully supported by the load cells.

In an alternative embodiment of the invention, in order to facilitate conversion of the nurse truck from a "transport" configuration to a "weighing" configuration, the hydraulic jacks are extended so as to lift the weigh-frame off of the interface beams; shims are placed between the weigh frame and the load cells; and the hydraulic lacks released to lower the weigh-frame until it is fully supported by the load cells, through the shims.

Conversion of the nurse truck back to the "transport" configuration is accomplished by extending the hydraulic jacks to raise the weigh-frame off the load cells; the linking elements (or shims, as appropriate) are removed; and the weigh-frame then lowered back onto the interface beams.

When the nurse truck is in the "transport" mode, the weigh-frame can be restrained in the vertical direction by means of latches or the like, adapted to provide secure restraint, while at the same time being readily released when it is desired to convert the nurse truck to the "weighing" configuration.

Longitudinal and lateral restraint of the weigh-frame can advantageously be provided by means of a set of positioning assemblies. In a preferred embodiment, the positioning assembly may, for example, comprise a probe mounted on the support-frame which can be inserted into a cooperating receptacle mounted on the weight frame, for example. The probe may be conicle in shape, in which case the positioning assembly may be referred to as a "cone-and-collar" assembly.

BRIEF DESCRIPTION OF THE DRAWINGS

Further objects, features and advantages of the present invention will become apparent from the following description of a preferred embodiment, with reference to the appended drawings, in which.

DETAILED DESCRIPTION OF THE PREFERRED EMBODIMENTS

The following description is directed to an embodiment of the present invention which is adapted as a nurse truck for transporting and dispensing liquid materials. However, it will be understood that this is in no way limitative of the present invention. In particular, it will be understood that the present invention can be adapted for use on any suitable vehicle, and may be used in connection with accurately measuring the weight of virtually any type of material.

Figure 1:
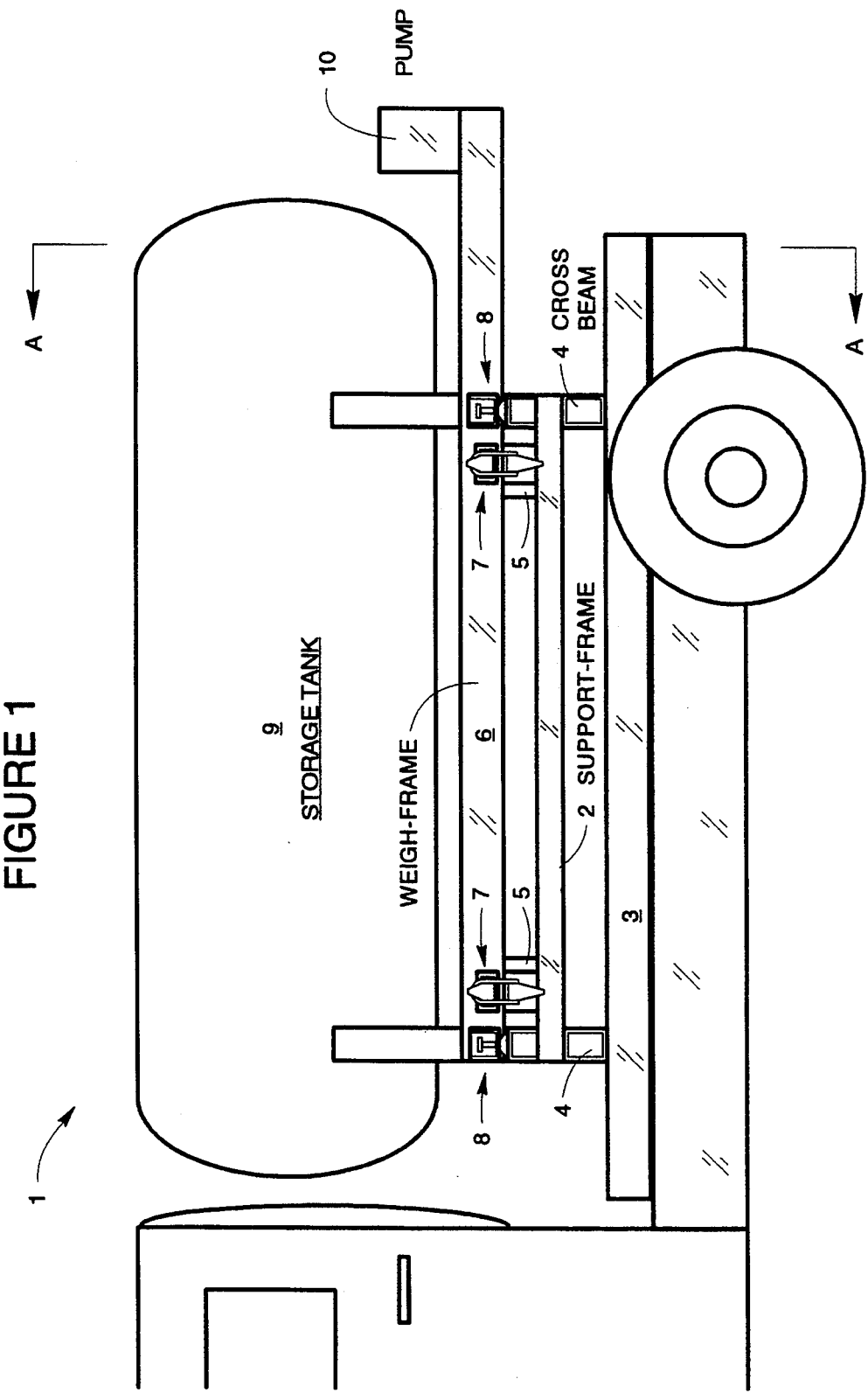
FIG. 1 is a partial side view of a nurse truck illustrating an embodiment of the present invention.

FIG. 1 diagrammatically illustrates a nurse truck 1 according to the present invention. The nurse truck 1 includes a support-frame 2 securely mounted on a frame 3 of the truck. It will be noted that the support-frame 2 may be attached to directly to the chassis frame of the truck, or alternatively to a flat-bed, or other type of frame assembly securely attached to the chassis frame. The support-frame can be substantially rectangular in construction, and may be fastened to the truck frame 3 by means of bolts and/or welding. As shown in the illustrated embodiment, the support-frame may be separated from the truck frame 3 by suitable cross-beams 4, if required.

The weigh-frame 6 is mounted above the support-frame 2, and provides a frame on which storage tanks 9 and product dispensing pumps 10, as well as the associated plumbing (not shown) are mounted.

Interface beams 5 are mounted on top of the support-frame (in this embodiment, in the vicinity of each corner thereof), and are securely fastened thereto, for example, by welding. The interface beams 5 serve to separate the support-frame 2 from the weigh-frame 6, and also serve as a mounting point for an over-centring latch 7 and a positioning device 8 near each corner of the support-frame 2.

Figure 2:
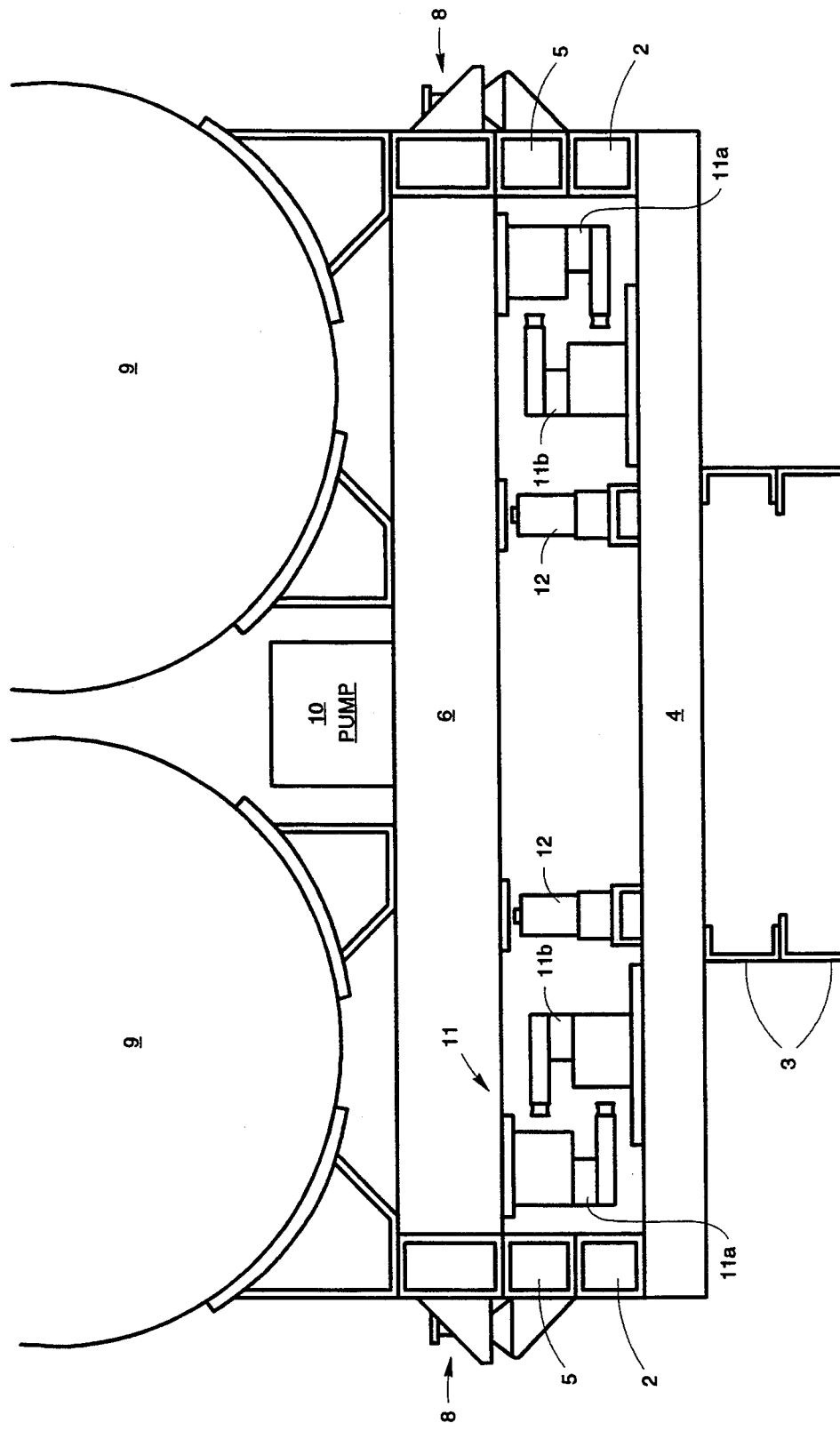
FIG. 2 is an end-view along section A—A of FIG. 1 when the weight measurement system is in a "transport" configuration.

FIG. 2 illustrates an end view of the truck illustrated in FIG. 1, seen in the direction indicated by arrows A—A, with the nurse truck in the "transport" configuration. Between the cross-beam 4 weigh-frame 6, there are disposed load cells 11, and hydraulic jacks 12. Each of the load cells 11 are preferably mounted near respective corners of the frame, so as to provide a stable support for the weigh-frame 6, when in a "weighing" configuration (described in greater detail below). The hydraulic jacks 12 are preferably mounted immediately inboard of the load cells 11 to as to provide maximum stability during transition from the "transport" to the "weighing" configuration.

Referring still to FIG. 2, it will be seen that, in the "transport" configuration, the weigh-frame 6 rests upon the interface beams 5, and is thus supported by the support-frame 2 and cross-beams 4. In this configuration, the load cells 11 are completely un-loaded (i.e. not subject to any of the weight of the weigh-frame 6, and will thus not be affected by high transient loads which might occur during transport.

Figure 3:
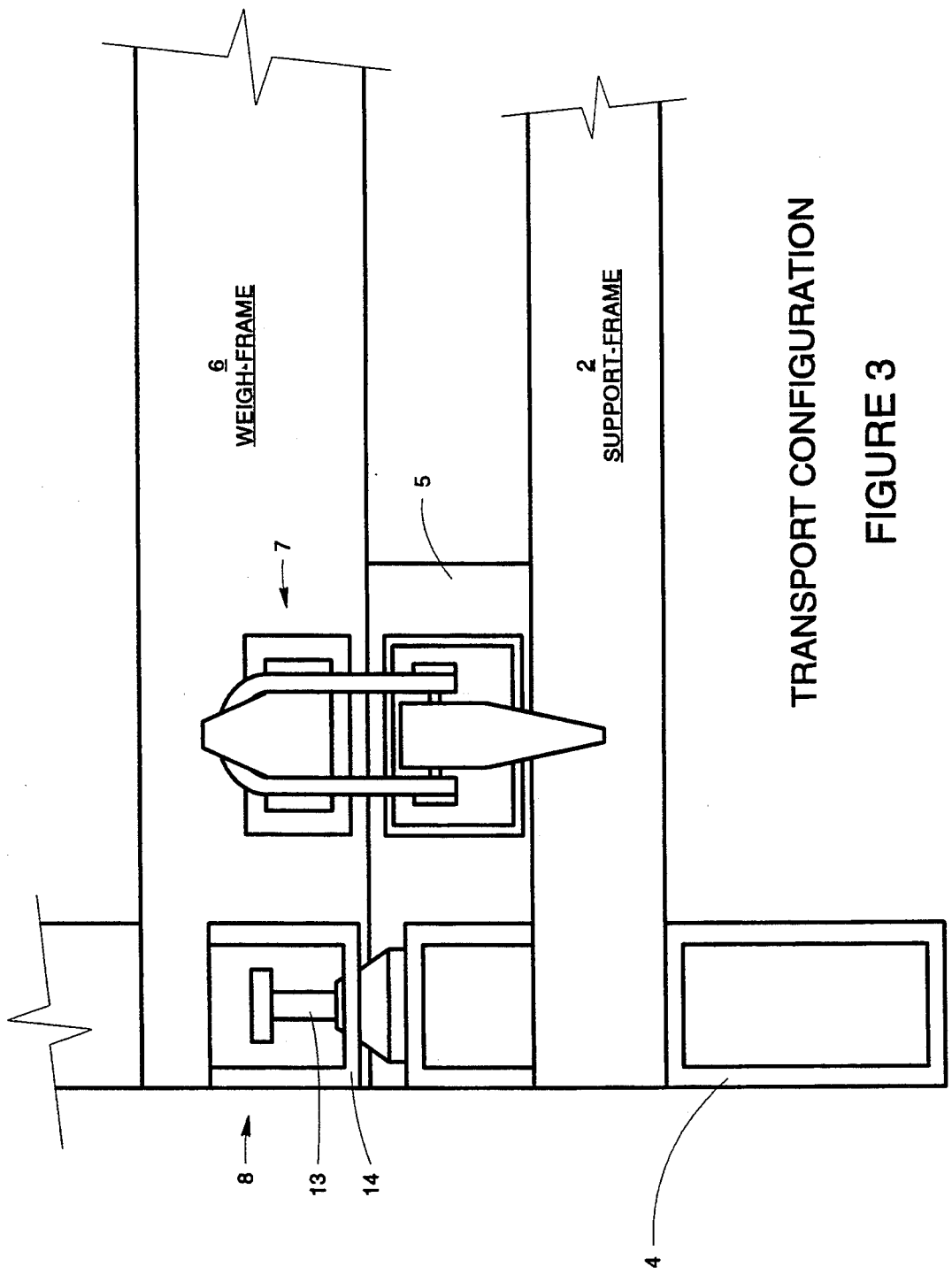
FIG. 3 is a side view illustrating an embodiment of the positioning means and the locking means of the invention, when the weight measurement system is in a "transport" configuration.

Referring now to FIG. 3, an enlarged view of the over-centring latch 7, and positioning device 8 are illustrated in the "transport" configuration. The over-centring latch 7 serves to restrain the weigh-frame 6 in the vertical direction. It will be apparent, in this regard, that the over-centring latch is merely one possible embodiment of a restraining means which may be used in this type of situation, and is therefore not limitative of the invention.

The positioning means 8, comprises a generally cone-shaped centring probe 13, and a co-operating collar 14. As illustrated in FIG. 3, in the transport configuration, the collar 14 fits snugly over the cone of the centring probe 13. By this means, the centring probe 13 and collar 14 cooperate to prevent lateral of longitudinal movement of the weigh-frame 6 with respect to the support-frame 2. Here again, it will be apparent that the described cone-and collar assembly is merely one possible embodiment of a lateral and longitudinal restraining means which may be used in this type of situation, and is therefore not limitative of the invention.

The combined effect of the over-centring latch 7 and the positioning device 8, in this case, is to effectively lock the weigh-frame 6 to the support-frame 2 when in the "transport" configuration.

In the illustrated embodiment, each load cell 11 is composed of two similar load cell components 11a and 11b, each of which includes a load-arm 11c which is adapted to receive thereon a load to be measured. Thus the load cell can be used to measure the weight of the weigh-frame 6 only by lifting the weigh-frame 6 off of the interface beams 5, and then be connecting the respective load arms 11c of the corresponding load cell components 11a and 11b. This situation is illustrated in FIG. 4, which shows an end view of the truck as per FIG. 2, but this time in the "weighing" configuration.

Figure 4:
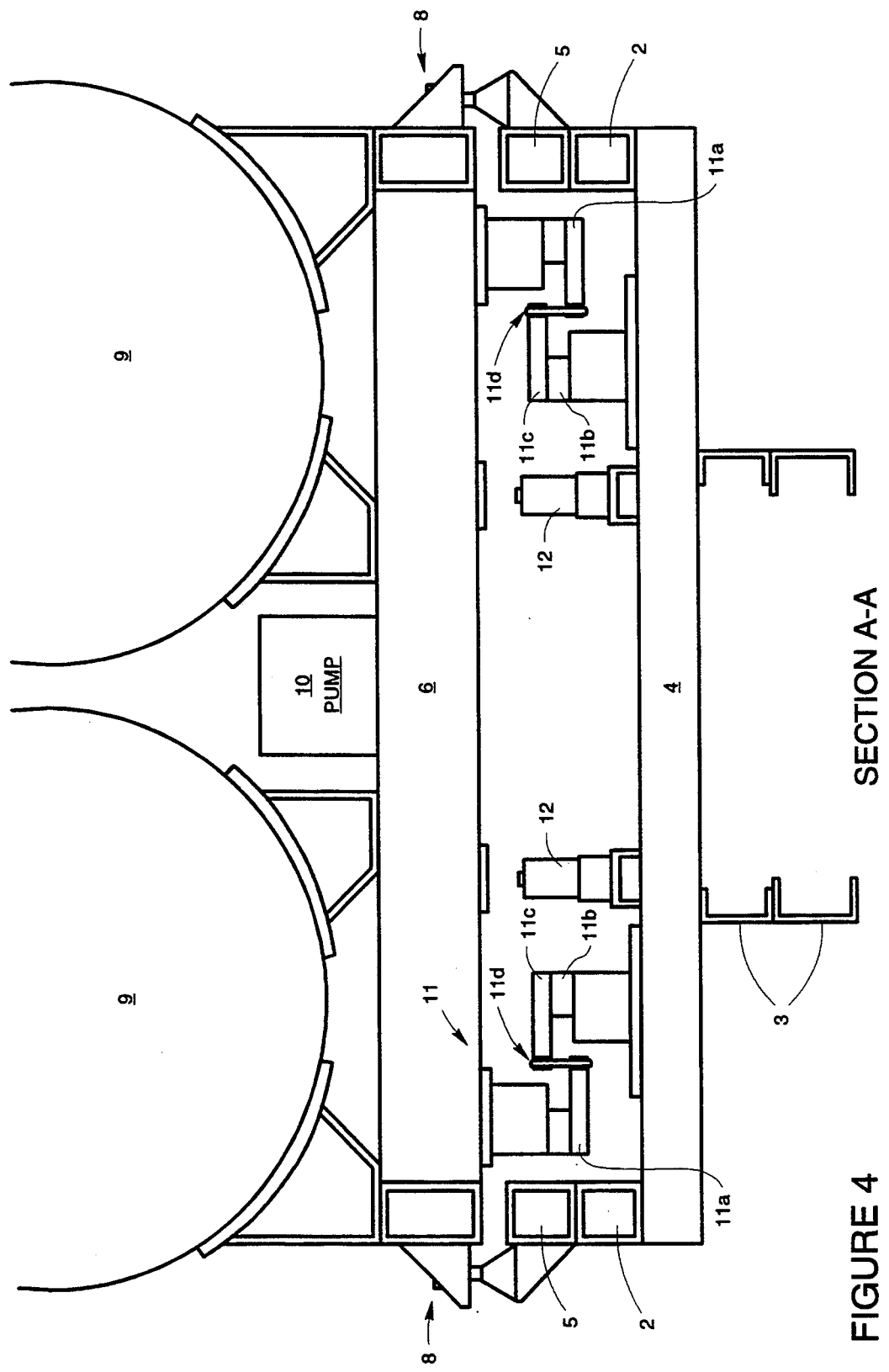
FIG. 4 is an end-view along section A—A of FIG. 1 when the weight measurement system is in a "weighing" configuration.

It can be seen from FIG. 4 that in the weighing configuration, the load arms 11c of the load cell components 11a and 11b, are tied together by links 11d, which are sufficiently short to ensure that the weigh-frame 6 is supported off of the interface beams 5, and the entire weight of the weigh-frame 6 is supported by the load cells 11.

Figure 5:
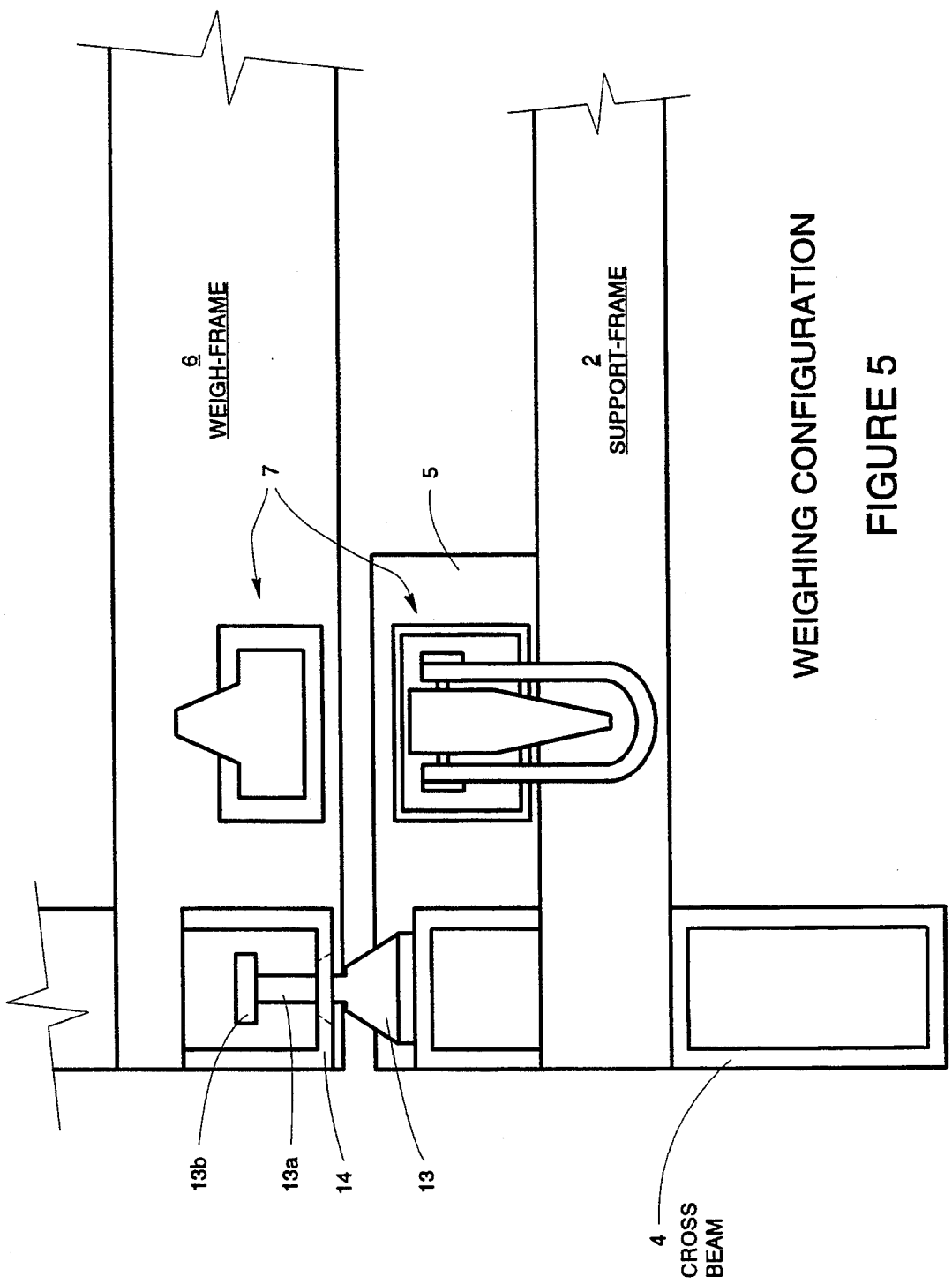
FIG. 5 is a side view illustrating an embodiment of the positioning means and the locking means of the invention, when the weight measurement system is in a "weighing" configuration.

Referring now to FIG. 5, it can be seen that, in the "weighing" configuration, the latch 7 is released, and the collar 14 of the positioning device 8 has lifted off of the cone 13. Thus the weigh-frame 6 is unrestrained by either the latch 7, or the positioning device 8. However, it will be noted that the cone 13 includes an upward cone extension 13a which projects through the collar 14, and terminates at a retainer cap 13b. The cone extension 13a serves to prevent excessive lateral or longitudinal movement of the weigh-frame 6, when in the "weighing" configuration. Similarly, the retainer cap 13b, which is larger in size than the diameter of the collar 14, serves to prevent excessive upward movement of the weigh-frame. Finally, when the weigh-frame is lowered down onto the interface beams 5 during transition from the "weighing" to the "transport" configurations, the cone 13 and collar 14 cooperate to ensure that the weigh-frame comes to rest in the appropriate position. Thus it will be seen that the positioning device 13, in addition to holding the weigh-frame against lateral forces in the "transport" configuration, prevents excessive horizontal and vertical movements in the "weighing" configuration, and also ensures that the weigh-frame returns to the proper position when transitioning from the "weighing" to the "transport" configurations.

Figure 6:
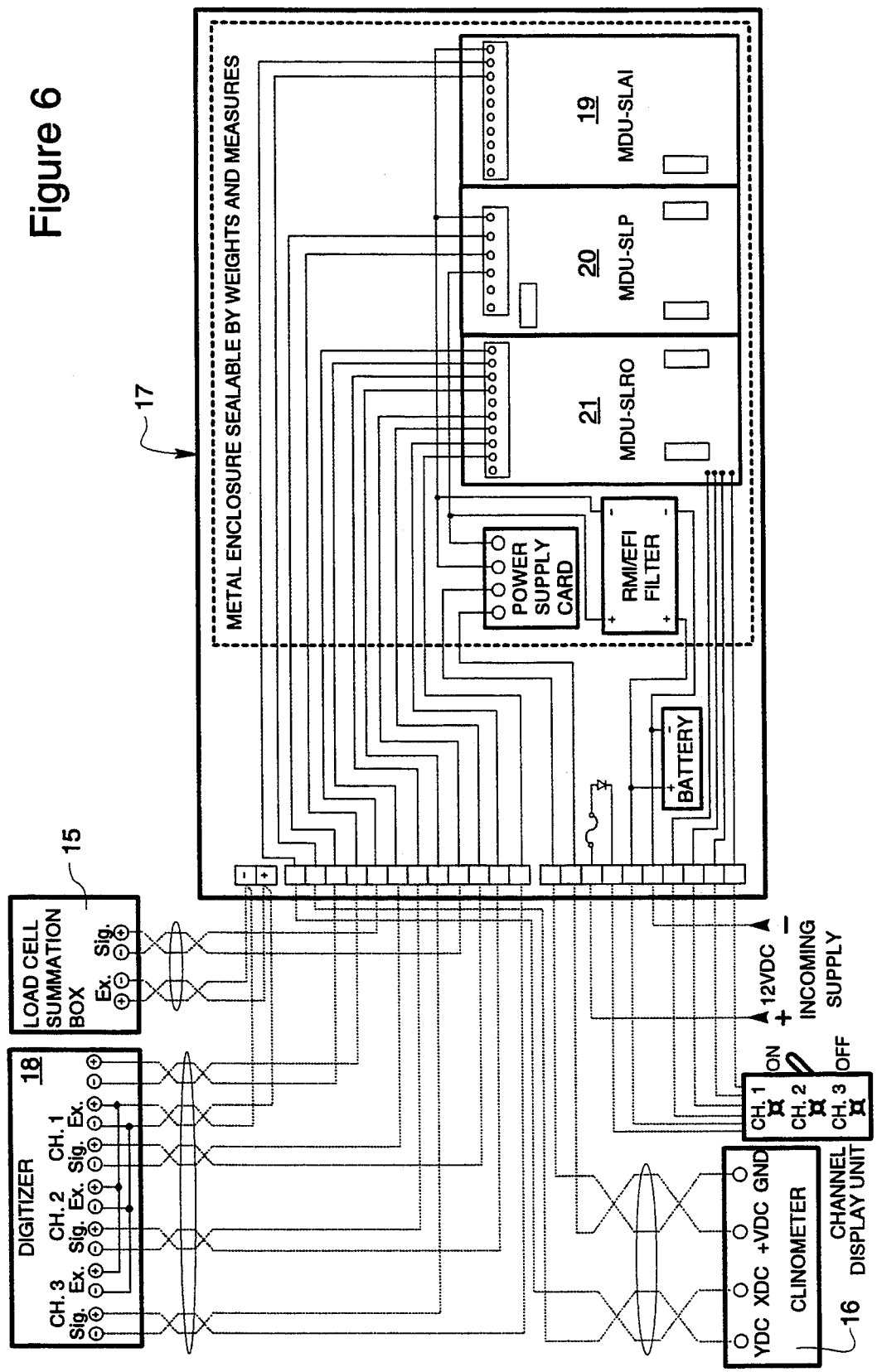
FIG. 6 is a schematic illustration of an embodiment of an apparatus for determining the weight of product according to the invention.

FIG. 6 is a schematic diagram of an embodiment of a weight measuring system as employed in the present invention. The system comprises a load cell summation unit 15, which combines the signals generated by the load cells, and produces a load-signal proportional to the total weight of the weigh-frame 6. A dual-axis clinometer 16 generates a pair of signals indicative of the angular orientation of the support-frame 2 in respective orthogonal (i.e. X and Y) axes. The load-signal from the load cell summation unit 15 is supplied to a switch unit 17, and also to an input of a multi-channel digital weight indicator 18. The load cell summation unit 15, clinometer 16 and the multi-channel digital weight indicator 18 may be, for example, conventional electronic components, and will therefore not be discussed in detail here. The switch unit 17 includes an analogue input unit 18 for receiving the X and Y axis signals generated by the clinometer 16. These signals are then passed to a processor unit 20 which determines the angular orientation of the support-frame 2, and then generates a control signal which is then passed to a relay output unit 21. The relay output unit 21 is connected to each of the input channels of the multi-channel weight indicator 18. In response to the control signal from the processor unit 20, the relay output unit 21 selects an appropriate channel, and transmits a calibration range selection signal to the multi channel weight indicator 18. The multi channel weight indicator 18, can be preprogrammed with a number of calibration ranges (for example 3) associated with each of its input channels. Thus upon receipt of a calibration range selection signal from the relay output unit 21, the appropriate calibration range of the multi-channel weight indicator 18 can be selected to compensate for an error in the weight detected by the load cells, due to the load cells being oriented at an angle with respect to the vertical.

It will be apparent to those skilled in the art that there are a variety of ways in which the present invention may be varied without departing from the scope of the present invention. For example, the load cells are described above as being arranged into pairs of cooperating load cells, which are connected to each other by linking elements in the "weighing" configuration. However, it will be apparent that each pair of load cells may be replaced by a single load cell. Similarly, the linking element described above (which operates in tension when installed in the "weighing" configuration) may be replaced with a shim, or the like, which is subject to compressive loading when in the "weighing" configuration. Thus it will be apparent that there are many ways by which the load cells and load transfer thereto may be effected.

Similarly, the operation weight measurement system of the invention is described above in terms of detecting the angular orientation of the support-frame, and then switching the multi channel weight indicator to an appropriate predetermined calibration range. However, it will be apparent that the processor unit 20, could be programmed to calculate all of the parameters required to define a calibration of the multi-channel digital weight indicator, and then pass these parameters to the multi-channel digital weight indicator. This would facilitate adjustment of the calibration of the multi-channel digital weight indicator to compensate for substantially the exact angular orientation of the support frame, rather than being restricted to a fixed set of predetermined discrete calibration ranges.

It will therefore be apparent that the precise physical implementation of the load cells and the weighing system will, to a degree, be a matter of design choice, and may thus vary from one embodiment to the next without departing from the intended scope of the claims.

We claim:

1. An on-board weigh scale for a vehicle, said weigh scale having a transport configuration wherein the weigh scale is substantially protected from damage during transport, and a weighing configuration wherein the weigh scale is in an operative condition for measuring the weight of a material, said weigh scale comprising:

a support-frame capable of being mounted on a frame of a vehicle;
   a weigh-frame operatively disposed above said support-frame, and capable of supporting a quantity of a material;
   support means disposed on said support-frame and capable of securely supporting said weigh-frame in the transport configuration;
   lifting means capable of lifting said weigh-frame off of said support means when said weigh scale is in transition between the transport and the weighing configurations;
   a plurality of load cells, each load cell being capable of supporting a load and generating a signal proportional to the magnitude of said load;
   respective load transfer means for transferring a portion of the weight of said weigh-frame onto each said load cell when said weigh scale is in the weighing configuration, said load transfer means being removable in the transport configuration;
   angle sensing means capable of detecting an angle of orientation of said weigh scale, and generating a signal proportional to the detected angle; and
   processing means capable of determining the weight of a material on said weigh-frame on the basis of signals received from each said load cell, and said angle sensing means.

2. An on-board weigh scale as claimed in claim 1, wherein said weigh-frame includes a container for storing the material.

3. An on-board weigh scale as claimed in claim 1, wherein said weigh-frame includes dispensing means adapted to facilitate dispensing the material from said weigh-frame.

4. An on-board weigh scale as claimed in claim 3, wherein said dispensing means comprises a pump for dispensing fluid materials.

5. An on-board weigh scale as claimed in claim 1, wherein said support means comprises a structural support for supporting the weigh-frame in spaced relation from said support-frame in the transport configuration.

6. An on-board weigh scale as claimed in claim 1, further comprising positioning means adapted to hold said weigh-frame against horizontal forces in the transport configuration.

7. An on-board weigh scale as claimed in claim 6, wherein said positioning means is further adapted to prevent excessive horizontal movement of said weigh-frame in the weighing configuration.

8. An on-board weigh scale as claimed in claim 6, wherein said positioning means is further adapted to guide said weigh-frame into a proper position with respect to said support-frame during transition from the weighing configuration to the transport configuration.

9. An on-board weigh scale as claimed in claim 6, 7 or 8, wherein said positioning means comprises a generally cone-shaped positioning probe mounted on either said support-frame or said weigh-frame, and a cooperating collar disposed to accept said positioning probe mounted on either said weigh-frame or said support frame.

10. An on-board weigh scale as claimed in claim 6, 7 or 8, wherein said positioning means comprises a generally pyramid-shaped positioning probe mounted on either said support-frame or said weigh-frame, and a cooperating collar disposed to accept said positioning probe mounted on either said weigh-frame or said support frame.

11. An on-board weigh scale as claimed in claim 1, further comprising locking means adapted to releasably lock said weigh-frame to said support-frame in the transport configuration.

12. An on-board weigh scale as claimed in claim 11, wherein said locking means is an over-centring latch mechanism.

13. An on-board weigh scale as claimed in claim 1, wherein said plurality of load cells comprises one or more pairs of cooperating first and second load cells, said first load cell being mounted on said weigh-frame, and said second load cell being mounted on said support-frame.

14. An on-board weigh scale as claimed in claim 13, wherein said load transfer means comprises a link capable of operatively connecting said first and second load cells in the weighing configuration, such that a load can be transmitted from said weigh-frame into said first load cell, through said link to said second load cell, and finally into said support-frame.

15. An on-board weigh scale as claimed in claim 1, wherein said plurality of load cells are operably disposed on said support-frame.

16. An on-board weigh scale as claimed in claim 15, wherein said load transfer means comprises a shim disposed between said weigh-frame and each said load cell, whereby a load may be transferred, in the weighing configuration, from said weigh frame through said shim and into said load cell.

17. An on-board weigh scale as claimed in claim 1, wherein said lifting means comprises a hydraulic jack.

18. A nurse truck for transporting and dispensing a quantity of a material, said nurse truck comprising:
  storage means capable of containing therein a quantity of a material;
  dispensing means capable of controllably dispensing the material from said storage means;
  weight measuring means adapted to measure the weight of the material in said storage means, said weight measuring means having a transport configuration wherein the weight measuring means is substantially protected from damage during transport, and a weighing configuration wherein the weight measuring means is in an operative condition for measuring the weight of the material; and
  angle compensating means for detecting an angle of said weight measuring means with respect to vertical, and adjusting a calibration of said weight measuring means on the basis of said detected angle.

19. A nurse truck as claimed in claim 18, wherein said storage means is a tank adapted to contain therein a liquid material.

20. A nurse truck as claimed in claim 18, wherein said dispensing means is a pump.

21. A nurse truck as claimed in claim 18, wherein said weight measuring means comprises an on-board weight scale convertible from the transport configuration to the weighing configuration, and comprising:
  a support-frame mounted on a frame of said nurse truck;
  a weigh-frame operatively disposed above said support-frame, and capable of supporting a quantity of a material;
  support means disposed on said support-frame and capable of securely supporting said weigh-frame in the transport configuration;
  lifting means capable of lifting said weigh-frame off of said support means when said weigh scale is in transition between the transport and the weighing configurations;
  a plurality load cells, each load cell being capable of supporting a load and generating a signal proportional to the magnitude of said load;
  respective load transfer means for transferring a portion of the weight of said weigh-frame onto each said load cell when said weigh scale is in the weighing configuration, said load transfer means being removable in the transport configuration.

22. A nurse truck as claimed in claim 21, wherein said storage means and said dispensing means are mounted on said weigh-frame.

23. A nurse truck as claimed in claim 21, wherein said weight measuring means further comprises:
  signal receiving and conditioning means for receiving a signal indicative of a weight detected by each said load cell, and generating a weight signal indicative of the weight of the material; and
  processing means for determining a weight of the material on the basis of the signal generated by said signal receiving and conditioning means.

24. A nurse truck as claimed in claim 23, wherein said angle compensating means comprises angle detecting means for detecting an angular orientation of said weigh scale with respect to vertical, and for generating an angle signal indicative of said detected angle, and second processing means adapted to adjust a calibration of said first processing means in response thereto.

25. An on-board weigh scale for a vehicle, said weigh scale having a transport configuration wherein the weigh scale is substantially protected from damage during transport, and a weighing configuration wherein the weigh scale is in an operative condition for measuring the weight of a material, said weigh scale comprising:
  a support-frame for mounting on a frame of a vehicle;
  a weigh-frame operatively disposed above said support-frame, for supporting a quantity of material;
  support means disposed on said support-frame for securely supporting said weigh-frame in the transport configuration;
  lifting means for lifting said weigh-frame off of said support means in the weighing configuration;
  load cell means mounted on said vehicle for supporting a load and generating a signal proportional to the magnitude of said load;
  load transfer means for transferring the weight of said weigh-frame onto said load cell means in the weighing configuration, said load transfer means being removable in the transport configuration; and processing means for determining the weight of the material on said weigh-frame based on signals received from said load cell means.

26. An on-board weigh scale according to claim 25, further comprising angle sensing means for detecting an angle of orientation of said weigh scale and for generating a signal proportional to the detected angle, such that said processing means determines the weight of the material based on the respective signals from said angle sensing means and said load cell means.

27. An on-board weigh scale according to claim 26, wherein said load cell means comprises a plurality of load cells, said load transfer means transferring a portion of the weight of said weigh frame to respective load cells, each of said load cells generating a respective signal proportional to the portion of the weight transferred thereto, such that said processing means determines the weight of the material based on the respective signals from each of said load cells and said angle sensing means.

* * * * *